(12) United States Patent
Day-Richter et al.

(10) Patent No.: US 9,176,720 B1
(45) Date of Patent: Nov. 3, 2015

(54) INSTALLATION OF THIRD-PARTY WEB APPLICATIONS INTO A CONTAINER

(75) Inventors: John Day-Richter, Denver, CO (US); Brian Lewis Cairns, Boulder, CA (US); Eric Benson Schoeffler, Boulder, CO (US); Michael Jeffrey Procopio, Boulder, CO (US); Micah Lemonik, Great Neck, NY (US); Adam Wayne Besen, Lyons, CO (US); Brian Edgar Eaton, Mountain View, CA (US); Robert Eugene Wyrick, Firestone, CO (US)

(73) Assignee: Google Inc., Mountain View, CA (US)

( * ) Notice: Subject to any disclaimer, the term of this patent is extended or adjusted under 35 U.S.C. 154(b) by 360 days.

(21) Appl. No.: 13/453,232

(22) Filed: Apr. 23, 2012

(51) Int. Cl.
*G06F 9/445* (2006.01)
(52) U.S. Cl.
CPC .......................................... *G06F 8/61* (2013.01)
(58) Field of Classification Search
CPC .......................................................... G06F 8/61
USPC .......................................................... 717/176
See application file for complete search history.

(56) References Cited

U.S. PATENT DOCUMENTS

| | | |
|---|---|---|
| 7,263,688 B2 | 8/2007 | Pitzel et al. |
| 7,680,932 B2 | 3/2010 | Defaix et al. |
| 7,689,633 B1 | 3/2010 | Li et al. |
| 7,707,413 B2 | 4/2010 | Lunt et al. |
| 7,711,835 B2 | 5/2010 | Braddy et al. |
| 7,734,914 B1 | 6/2010 | Malasky |
| 7,779,113 B1 | 8/2010 | Samar |
| 7,827,201 B1 | 11/2010 | Gordon et al. |
| 7,941,419 B2 | 5/2011 | Bhatkar et al. |
| 7,996,380 B2 | 8/2011 | Arrouye et al. |
| 8,108,427 B2 | 1/2012 | Prahlad et al. |
| 8,131,723 B2 | 3/2012 | Sim-Tang |
| 8,151,323 B2 | 4/2012 | Harris et al. |
| 8,250,455 B2 | 8/2012 | Kadowaki et al. |
| 8,341,708 B1 | 12/2012 | Eatough et al. |
| 8,364,759 B2 | 1/2013 | Moromisato et al. |
| 8,478,817 B2 | 7/2013 | Duggal |
| 8,572,033 B2 | 10/2013 | Shukla |
| 8,706,800 B1 * | 4/2014 | Ahmed et al. ................ 709/203 |
| 8,856,176 B1 | 10/2014 | Venu et al. |
| 2003/0033369 A1 * | 2/2003 | Bernhard ...................... 709/203 |
| 2007/0106984 A1 * | 5/2007 | Birk Olsen et al. ........... 717/174 |
| 2008/0162493 A1 * | 7/2008 | Blohm et al. .................. 707/10 |
| 2008/0184157 A1 * | 7/2008 | Selig ............................. 715/781 |

(Continued)

FOREIGN PATENT DOCUMENTS

| | | |
|---|---|---|
| KR | 10-2010-0137323 | 12/2010 |
| KR | 10-2012-0010397 | 2/2012 |

OTHER PUBLICATIONS http://web.archive.org/web/20121021135356/http://support.mozilla.org/en-US/kb/find-and-install-add-ons-add-features-to-firefox.*

(Continued)

*Primary Examiner* — Li B Zhen
*Assistant Examiner* — Viva Miller
(74) *Attorney, Agent, or Firm* — Ropes & Gray LLP

(57) ABSTRACT

Techniques are shown for installing third-party applications onto a network system in appropriate containers on the network system. The containers store data and content of the same internet media type or MIME-type as the third-party applications.

20 Claims, 4 Drawing Sheets

(56) References Cited

U.S. PATENT DOCUMENTS

| | | |
|---|---|---|
| 2010/0274910 A1 | 10/2010 | Ghanaie-Sichanie et al. |
| 2010/0281528 A1 | 11/2010 | Hayton et al. |
| 2010/0325086 A1 | 12/2010 | Skinner et al. |
| 2010/0325199 A1 | 12/2010 | Park et al. |
| 2011/0066668 A1 | 3/2011 | Guarraci |
| 2011/0093507 A1 | 4/2011 | Pilip |
| 2011/0137979 A1 | 6/2011 | Seo et al. |
| 2011/0154290 A1 | 6/2011 | Kelly |
| 2011/0184993 A1 | 7/2011 | Chawla et al. |
| 2011/0202672 A1 | 8/2011 | Narayanaswamy et al. |
| 2011/0209045 A1 | 8/2011 | Ghosh et al. |
| 2011/0231912 A1 | 9/2011 | Lee et al. |
| 2011/0247074 A1 | 10/2011 | Manring et al. |
| 2011/0252038 A1 | 10/2011 | Schmidt et al. |
| 2011/0252071 A1 | 10/2011 | Cidon |
| 2011/0258535 A1 | 10/2011 | Adler, III et al. |
| 2012/0005159 A1 | 1/2012 | Wang et al. |
| 2012/0095878 A1 | 4/2012 | Feldman et al. |
| 2012/0099135 A1 | 4/2012 | Ono |
| 2012/0110646 A1 | 5/2012 | Ajitomi et al. |
| 2012/0144202 A1 | 6/2012 | Counterman |
| 2012/0144454 A1 | 6/2012 | Lee |
| 2012/0158668 A1 | 6/2012 | Tu et al. |
| 2012/0192067 A1 | 7/2012 | DeLuca et al. |
| 2012/0254042 A1 | 10/2012 | Ludemann |
| 2012/0266229 A1 | 10/2012 | Simone et al. |
| 2013/0018904 A1 | 1/2013 | Mankala et al. |
| 2013/0036455 A1 | 2/2013 | Bodi et al. |
| 2013/0086670 A1 | 4/2013 | Vangpat et al. |
| 2013/0111336 A1 | 5/2013 | Dorman et al. |
| 2013/0124606 A1 | 5/2013 | Carpenter et al. |
| 2013/0144934 A1 | 6/2013 | Swett et al. |
| 2013/0304797 A1 | 11/2013 | Warren et al. |

OTHER PUBLICATIONS http://web.archive.org/web/20120819143535/https://addons.mozilla.org/en-US/firefox/extensions/?sort=featured.*
http://web.archive.org/web/20121020134710/https://addons.mozilla.org/en-US/seamonkey/extensions.*
https://addons.mozilla.org/En-us/seamonkey/addon/gmail-smime/?src=search.*
http://www-archive.mozilla.org/projects/webservices/.*
http://web.archive.org/web/20120512130530/https://developer.mozilla.org/en/Setting_up_extension_development_environment.*
http://web.archive.org/web/20110629120453/https://developer.mozilla.org/en/Setting_up_extension_development_environment.*
https://addons.mozilla.org/en-US/firefox/addon/extension-manager-extended/.*
http://web.archive.org/web/20111006093926/https://addons.mozilla.org/en-US/firefox/extensions/?sort=featured.*
http://web.archive.org/web/20111226173518/http://en.wikipedia.org/wiki/Add-on_(Mozilla).*
Beresford et al., "MockDroid: Trading Privacy for Application Functionality on Smartphones," HotMobile 'Mar. 1-3, 2011, Phoenix, AZ, USA.
Bibi et al., "A Platform for Delivering Multimedia Presentations on Cultural Heritage," 2010 14th Panhellenic Conference on Informatics, pp. 175-179.
Ellis et al., "Concurrency Control in Groupware Systems," ACM 1989, pp. 399-407.
Guo et al., "Building the PolarGrid Portal Using Web 2.0 and OpenSocial", Nov. 14-20, 2009 Portland, Oregon, USA; Copyright 2009 ACM, 8 pages.
http://web.archive.org/web/20110629120453/https://developer.mozilla.org/en/Setting_up_extension_development_environment, printed Jan. 9, 2015, 5 pages.
http://web.archive.org/web/20111219132014/https://addons.mozilla.org/en-US/seamonkey, printed Oct. 26, 2014, 5 pages.
http://web.archive.org/web/20120512130530/https://developer.mozilla.org/en/Setting_up_extension_development_environment, 2012, 7 pages.
http://web.archive.org/web/20120819143535/https://addons.mozilla.org/en-US/firefox/extensions/?sort=featured, printed Dec. 13, 2013, 3 pages.
http://web.archive.org/web/20121020134710/https://addons.mozilla.org/en-US/seamonkey/extensions, printed Dec. 13, 2013, 3 pages.
http://web.archive.org/web/20121021135356/http://support.mozilla.org/en-US/kb/find-and-install-add-ons-add-features-to-firefox, printed Dec. 13, 2013, 3 pages.
http://www-archive.mozilla.org/projects/webservices/, snapshot taken Apr. 21, 2008, printed Dec. 13, 2013, 4 pages.
https://addons.mozilla.org/En-us/seamonkey/addon/gmail-smime/?src=search, printed Dec. 13, 2013, 2 pages.
International Search Report and Written Opinion dated Jul. 28, 2014 in International Application No. PCT/US2014/029756, 11 pages.
International Search Report and Written Opinion dated Jun. 26, 2013 for Application No. PCT/US2013/037701, 10 pages.
International Search Report and Written Opinion dated Oct. 31, 2013 for Application No. PCT/US2013/047877, 9 pages.
International Search Report and Written Opinion dated Oct. 31, 2013 for Application No. PCT/US2014/032167, 11 pages.
International Search Report and Written Opinion for PCT/US2013/037773 dated Apr. 23, 2013.
Mayer et al., "Third-Party Web Tracking: Policy and Technology," 12 Proceedings of the 2012 IEEE Symposium on Security and Privacy, pp. 413-427, May 20-23, 2012.
Nauman et al., "Apex: Extending Android Permission Model and Enforcement with User-Defined Runtime Constraints," ASIACCS '10 Apr. 13-16, 2010 Beijing, China.
Nichols et al., High-Latency, Low-Bandwidth Windowing in the Jupiter Collaboration System, UIST '95. 8th Annual Symposium on User Interface Software and Technology. Proceedings of the ACM Symposium on User Interface SoftwareandTedmology,Nov. 14-17, 1995, 111-120.
The Oauth 2.0 Authorization Protocol; draft Ietf-oauth-v2-24; Mar. 8, 2012.
Zhou et al., "Taming Information-Stealing Smartphone Applications (on Android)," LNCS 6740:93-107 (2011).
Zissis et al., "Addressing Cloud Computing Security Issues", Future Generation Computer Systems 28 (2012) 583-592.

* cited by examiner

INSTALLATION OF THIRD-PARTY WEB APPLICATIONS INTO A CONTAINER

BACKGROUND

Cloud storage is networked online storage where data is stored or hosted on one or more remote servers communicatively coupled to clients over one or more networks. This data may take the form of database content, user files, or other data content generally shared over a network. Hosting of the network storage typically occurs in large data centers and customers may lease storage capacity from these hosts. The data center operators, in the background, virtualize the resources according to the requirements of the customer and expose them as storage pools, which the customers can themselves use to store files or data objects. Physically, the resource may span across multiple servers at multiple locations and may be replicated in various data centers proximate to the customers or their end users. These cloud storage services may be accessed through a web service application programming interface (API), or through a Web-based user interface.

SUMMARY

A computer-implemented method facilitates installation of a third-party application onto a network system. The method includes receiving a selection from a user of a third-party application to be installed onto the network system, and obtaining configuration information for the third-party application. Based upon the obtained configuration information, the techniques include selecting a container on the network system for receiving the third-party application, and installing the third-party application into the selected container.

Implementations may include corresponding systems, apparatus, and computer programs, configured to perform the actions of the methods, encoded on computer storage devices. This Summary is not intended to introduce key features or essential features of the claimed subject matter, but merely provides a selection of concepts that are further described in the Detailed Description. Further implementations, features, and advantages, as well as the structure and operation of the various implementations are described in detail below with reference to accompanying drawings.

BRIEF DESCRIPTION OF THE FIGURES

Implementations are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
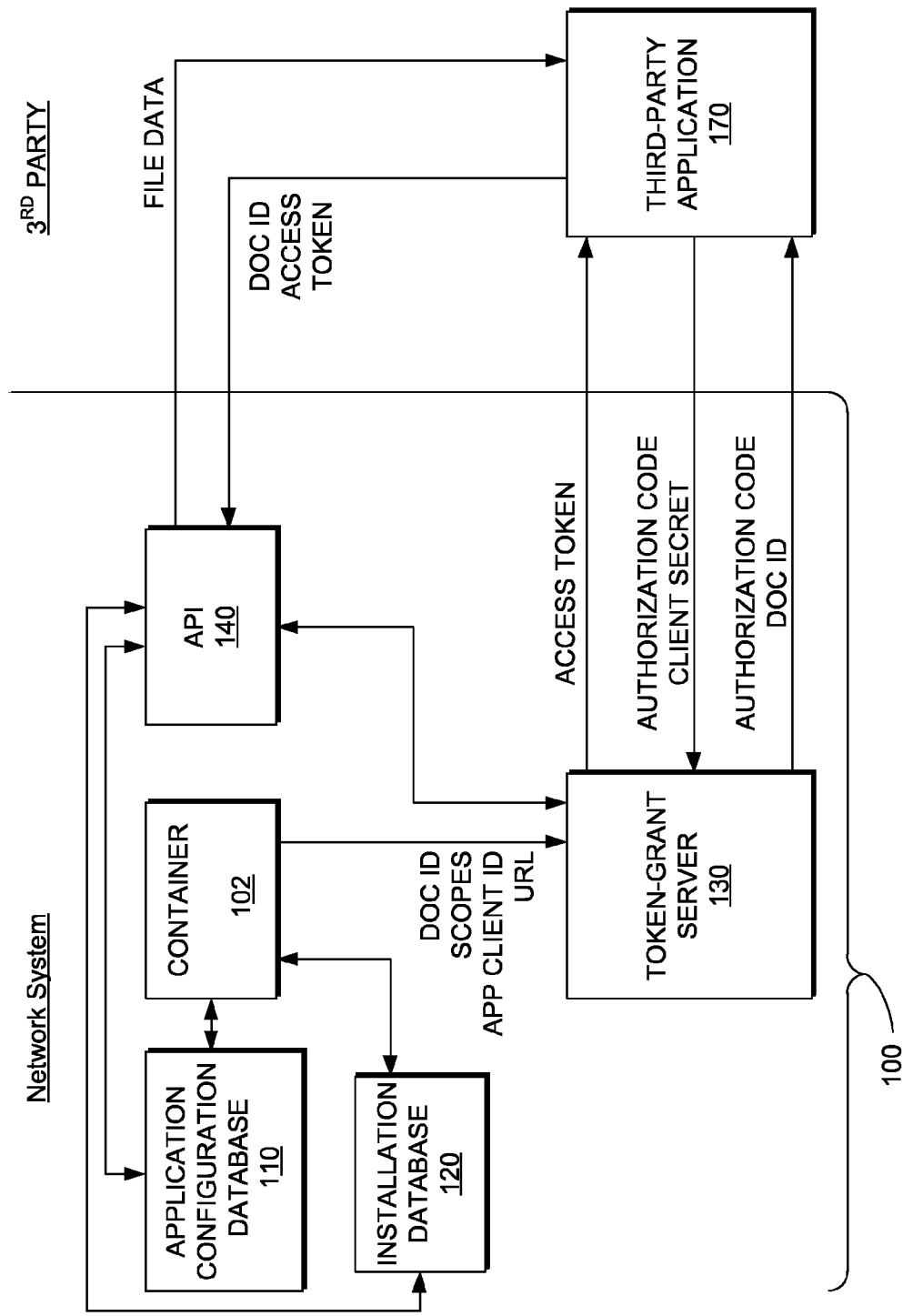
FIG. 1 is a schematic diagram of a network system in accordance with one or more implementations of the disclosure.

With the new techniques described herein, third-party applications are installed onto a web-based, online, or network system (hereinafter referred to as a "network system") in an appropriate environment or container. The network system determines which container is appropriate based, at least in part, upon what data type that the third-party application operates upon.

Storing a record of the installation of the third-party application into the selected container results in linking the user with the third-party application on the network system. An application configuration database stores descriptions and configuration attributes of third-party applications, and the descriptions and configuration attributes of the third-party applications enable the third-party applications to access user resources stored on the network system. User resources may include files, data, and other content that a user has created or otherwise obtained, and that the user has one or more of ownership of, access to, or control over.

A uniform resource locator (URL)-accessible installation utility provides a URL destination address from which a user can initiate an installation action to install a third-party application on the network system. Installation of a third-party application on the network system means that the network system creates a record in a distributed installation database of the network system, linking the user or the user's account with the identification (ID) of the newly installed third-party application.

The network system indicates an appropriate web-based application, environment, or "container" on the network system into which a third-party application is installed. The container is appropriate for the type of third-party application installed because the container also stores the types of resources that the third-party application is designed to open, preview, edit, work with, or perform functions on. An application installation database stores a record of user installation actions including information linking a user with an identification of each application installed by the user into an appropriate container on the network system. An Application Programming Interface (API) library is configured to allow searching of the application installation database to discover the third-party applications installed for a particular user in a particular web-based application or container on the network system.

Installing an application is not to be confused with typical installation of software in which multiple files are copied to a user's hard drive or solid state drive and reside there until the software is uninstalled. Instead, an installed app is added to a list of applications visible to a user when they use the network system.

The act of "installing" the third-party application constitutes registering a relationship between a user and the third-party application, and acts as a step toward allowing the third-party application to access the user's resources on the network system.

For example, the installed third-party application may be controlled by a user's browser or other user interface, may be a temporary script or applet run by a user's browser (e.g., on Java' or another platform-independent virtual machine), may be a plug-in to a user's browser, may be on a remote computer and remote controlled by a user's client machine, or otherwise accessed or controlled.

A container is a term used herein to describe an operating environment in which homogenous or like data types are handled, managed, and used. For example, a user may access an online service that operates on files formatted in a dynamically typed concatenative programming language called "PostScript" (which typically has a .EPS or .PS extension). In another example the user may access an online service that handles (e.g., opens, edits, and saves) files in one of several similar formats for spreadsheet documents. Examples of such similar formats include OpenDocument Format (ODF), comma-separated values (CSV) format, and Office Open XML format. According to this example, a first container may be used for PostScript applications and a second container may be used for spreadsheet applications. It should be understood however, that containers may not be limited to specific file types and may related to more generic application types. For example, a first container may be used for photo applications and a second container may be used for office productivity applications.

When a developer (e.g., third party) creates a third-party application and wants the application to be available to users of the network system, the developer provides application configuration information to the network system. The configuration information may include a description of the types of data the third-party application is designed to work with or operate on, and the services that the third-party application performs.

With this configuration information, the network system, employing the techniques described herein, categorizes and installs the third-party application into an appropriate container where similar type applications and data are installed. For example, if the third-party application edits spreadsheets in one or more of the various spreadsheet formats, the network system may install that third-party application in a container specifically designated for applications that edit these spreadsheet formats.

The one or more services performed by that type of application are characteristic of the services performed by other applications installed to that particular container. One of the benefits of sorting particular types of applications into similarly typed and separate containers is that each container will only receive data and instructions that are contextually relevant to the applications that are installed in that container. Furthermore, a library of these installations in designated containers allows the network system to find applications in each container installed by particular users to work on certain types of data. In a network system having a wide variety of types of applications that only work on corresponding types of data, the ability to install a particular type of application in an area, environment, or "container" of similar type applications, means that the particular container or environment of the network system will not have to look for or receive contextually irrelevant data and instructions.

Third-party applications may be software applications or programs developed by a party other than the owner or operator of the network system. Third-party applications may also include applications that are on different servers and/or have different access control than the network system, irrespective of actual ownership. For example, it should be understood that a software application developed or operated by the owner or operator of the network system may require the same installation procedures as third-party applications. An application configuration database stores descriptions and configuration attributes of installed third-party applications. These descriptions and configuration attributes enable the third-party applications to access user resources stored on the network system. A configuration database on the network system stores information relevant to integration of the third-party application with the network system, including application name, OAuth client id and OAuth scopes.

OAuth is an open standard for authorization. It allows users to share user resources (e.g. photos, videos, files, documents, contact lists) stored on one network system site with a third-party web site or one or more third-party applications, without having to provide their credentials to the third party for accessing the web site where the user's resources are stored. OAuth allows the user to follow security protocols that may include supplying a username and an access token to the third party, rather than all of their credentials normally needed to access the web site where their resources are stored.

Each access token may grant access to a specific third-party site (e.g., a video editing site) for specific resources (e.g., just videos from a specific album) and for a defined duration (e.g., the next 2 hours). This allows a user to grant a third-party site or application access to their information stored with another web-based service provider, without sharing their access permissions or the full extent of their data. The access permissions granted by an OAuth access token can include read only permission, read and/or write permission, or other levels of access that vary depending on the resource. This information facilitates generation of the authentication tokens used to allow third-party applications to act on behalf of a user.

Additional stored information may include the multipurpose internet mail extension (MIME) types or internet media types that the third-party applications can perform functions on, open, preview, process, manipulate, etc. As one example, a spreadsheet program is designed to handle tabular data that can be entered into a spreadsheet and can have spreadsheet functions performed on the data. Tabular data that can be entered and manipulated in a spreadsheet is of the MIME type, or internet media type that can be handled by the spreadsheet program. But typically a spreadsheet program would not be able to work with data of a different MIME type, or internet media type, such as data associated with images. Therefore, installation of a third-party application into a particular container on the network system ensures that the application will be able to interpret and process the type of data stored in that container.

One way to store the files is in a binary file encoding format in accordance with MIME. Internet media type, or MIME-type, is an Internet Engineering Task Force (IETF) standard that describes a mechanism for specifying binary file encodings in a standardized way. Aspects of MIME are described in several IETF standards documents such as RFC2045, RFC2046, RFC4288, and others. The string that describes a binary file type is usually referred to as a "MIME-type". For binary files, a particular, well-defined encoding schema is used that determines how the binary data in the file should be interpreted. For example, the JPEG image encoding standard describes a mapping between the binary data in an image file and a visual rendering of that image. "JPEG" is an acronym for Joint Photographic Experts Group, and is a commonly used method of lossy compression for digital photography. The MIME-type for JPEG is image/jpeg. Several other MIME-types exists for common, standardized file types and multimedia digital encoding formats such as MP3, MP4, QuickTime, Windows Media Audio/Video, GIF, PNG, TIFF, plain text, HTML, and XML.

The network system may provide a web-based installation action for third-party application. To initiate the installation of a particular application, and thereby grant access for that application to the user's data on the network system, the network system may present the user with a security page, screen, or pop-up notification. This notification may include appropriate disclosure regarding the application that will be installed and any access the application will acquire to the user's private data, as well as an "Install" button that the user may click to install the application. When a user decides to install a third-party application, the network system can display an OAuth dialog to the user, asking the user to authorize the third-party application to request access to certain user data the user wants the third-party application to be able to access on behalf of the user.

When the user clicks the "install" button, a record is written to a distributed database on the network system, linking the user with the identification (id) of the newly installed application id. The record may, for example, be a simple tuple, or ordered list of elements, of the form:
{long user_id; // a large number that uniquely identifies the user
long app_id; // a large number that uniquely identifies the application
optional long expiration_time; // an optional expiration date for this installation}

Users may uninstall an application by visiting a similar web-based action via a Uniform Resource Locator (URL) that links to an uninstall page. The uninstall page displays a warning explaining that an application is about to be uninstalled and an "uninstall" button that the user may click. If the user clicks the uninstall button, any records associating the user with the application in the installation database will be deleted.

The network system may determine which applications are available to a user by querying this installation database. If there is a non-expired database entry associating the user with an application id, the application with that id is considered "installed" for the user. When a user accesses the network system, the software will look up and display detailed application information in appropriate menus for each installed application.

As used herein, the term "module" may be understood to refer to hardware alone or a combination of hardware with software that renders data for use in a container. Modules may be personalized to user preferences, preferences of the container, preferences of the environment or other inputs.

Example Implementation

Referring initially to FIG. 1, a block diagram illustrates the relationship between a network system 100 and a third-party application 170, in accordance with an implementation of the disclosure. The network system 100 includes at least one container 102 that provides a logically or physically separated environment on the network system for receiving one or more third-party applications and the data that these applications work on.

The network system 100 further includes an application configuration database 110 configured to receive information on each third-party application that is installed on the network system. The network system records a relationship between each third-party application that is installed on the network system and the user who initiated the installation in an installation database 120.

A token-grant server 130 exchanges an authorization code, client secret, and document identification with a third-party application 170 before granting an access token to the third-party application. The third-party application 170 may make an Application Programming Interface (API) call to API 140 of the network system 100 to exchange the access token and document identification of a resource on the network system for file data pertaining to the resource. The third-party application may perform functions on the resource on behalf of the user who installed the third-party application for that purpose.

The third-party application 170 is installed in the container 102 on the network system 100. As explained above, this installation into a container consists of the network system registering a relationship between a user's account and the identification (ID) of the newly installed third-party application that has been associated with a particular logically or physically separated environment of the network system 100. Although only one container 102 is shown, one of ordinary skill in the art will understand from reading the entire disclosure that there could be a plurality of containers. A particular container could be a physically separate, or logically separate storage for data and content of a particular MIME-type, e.g., spreadsheet applications, image editing applications, web-page creating applications, etc.

The third-party application 170 provides information about itself to an application configuration database 110 on the network system 100 through an application programming interface (API) 140 of the network system 100. The container 102 on the network system 100 may contain the MIME-type data for the third-party application, or the type of data that the third-party application or applications being installed in the container can operate on. The information that the third-party application provides to the configuration database 110 includes the type of data that the third-party application is capable of operating on, and the scope of access that will be requested. A developer's console or interface can be provided by the network system 100 to act essentially as a self-service interface for application developers to enter information specific to their applications, including the type of data that their applications can operate on and the scope of access that will be requested.

The network system 100 can also include additional functionalities to enable an authentication of the third-party application 170 and grant the third-party application permission to access the user resource upon receiving the proper access token from the third-party application. As shown in FIG. 1, a token-grant server 130 can be provided. The token-grant server grants an access token to the third-party application 170 as a result of actions taken by a user.

In one implementation of the disclosure, the third-party application 170 may provide a uniform resource locator (URL) to the network system pointing back to the third-party application. A user can discover a third-party application that they are interested in by using a web browser, an application store or marketplace, a search engine, a developer's website, shared content from another user, and advertisements in conventional media or on the internet. The user may then install the discovered application. The installation can be done by any of different means that include directly from an application store or marketplace, using the uniform resource locator (URL) provided by the third-party developer, by opening a shared document, or other methods. A user clicks on that URL when they want to use the third-party application to open, create, or modify a resource such as a file, data, a document, or other content on the target web-based system. Alternative implementations can achieve a communicative coupling between a third-party application and the network system through non-http/web techniques.

In at least one implementation of techniques employed by the token-grant server 130, when the user discovers a third-party application they want to install, and the user clicks on an install button for that application, a security page pops up asking the user if they want to grant the third-party application access to a particular user resource so that the third-party application can perform functions on the user resource on behalf of the use. If the user accepts, the token-grant server sends an authorization code along with the document identification (ID) of the resource to the third-party application. The third-party application then sends the token-grant server the authorization code, along with a client secret generated by the third-party application. The client secret is unique to the third-party application and is used to verify the identity of the third-party. The third-party application also sends the document identification (ID) for the particular resource the requesting third-party application would like access to. The token-grant server 130 then sends an access token back to the third-party application 170, which is used by the third-party application to gain access to the resource on the network system 100.

Referring to FIG. 1, and as discussed above, a user can install a third-party application 170 written by a developer, and elect to allow that third-party application 170 to open files owned by the user and stored in the container 102 using "open with" or "default open with" functionality provided. The user can also use the third-party application 170 to create new files and other content on the web-based system 100, using "create with" functionality provided on the user's browser. The third-party application 170 can operate on data stored in the container 102 after being granted access, or create new data to be stored on the network system 100. As shown in FIG. 1, the third-party application 170 communicates over a network through an application programming interface (API) 140 for the network system 100. The user thereby gains the benefits of third-party applications that did not already exist on the network system, and can share those benefits with other users.

A user can discover a third-party application that they are interested in by using a web browser, an application store, a search engine, a developer's website, shared content from another user, and advertisements in conventional media or on the internet. The user may then install the discovered application. The installation can be done by any of different means that include directly from an application store, using a uniform resource locator (URL) provided by the third-party developer, by opening a shared document, or other methods. The act of "installing" the third-party application constitutes registering a relationship between a user's account and the third-party application, and acts as a step toward allowing the third-party application to access the user's resources on the network system that are associated with that user's account. When a user installs a third-party application, the network system 100 stores a record in an installation database 120.

The user then launches the third-party application 170 using functionality provided by the network system and presented to the user on their browser, or through script provided with a browser extension, such as "create with", "open with", or "default open with". The third-party applications that the user has installed, and that are of a type appropriate for working with a particular resource, may appear in a drop-down menu or list associated with the "create with", "open with", or "default open with" selections on their browser, or browser extension. At any time the user decides that they no longer want an installed third-party application to have access to their user-owned resources on the web-based system, the user can uninstall the third-party application.

A third-party application that has been installed by a user and granted permissions in accordance with the security protocols described herein, can work on data that is stored on the network system, or on data that is kept on the third-party server. The permissions granted to a third-party application can include read only, read and write, write only, or other levels of permission that could vary depending on the type of resource, the user, etc. A network system in accordance with various implementations of this disclosure makes it possible for users to access and share a wide variety of third-party applications that perform functions on data and content of many different types.

The approaches and systems described herein may be deployed in part or in whole through a machine that executes computer software, program codes, and/or instructions on one or more processors contained in the client devices and/or the server or servers associated with the web-based storage system.

Implementations of the disclosure may include a method on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform.

Example Techniques

Figure 2:
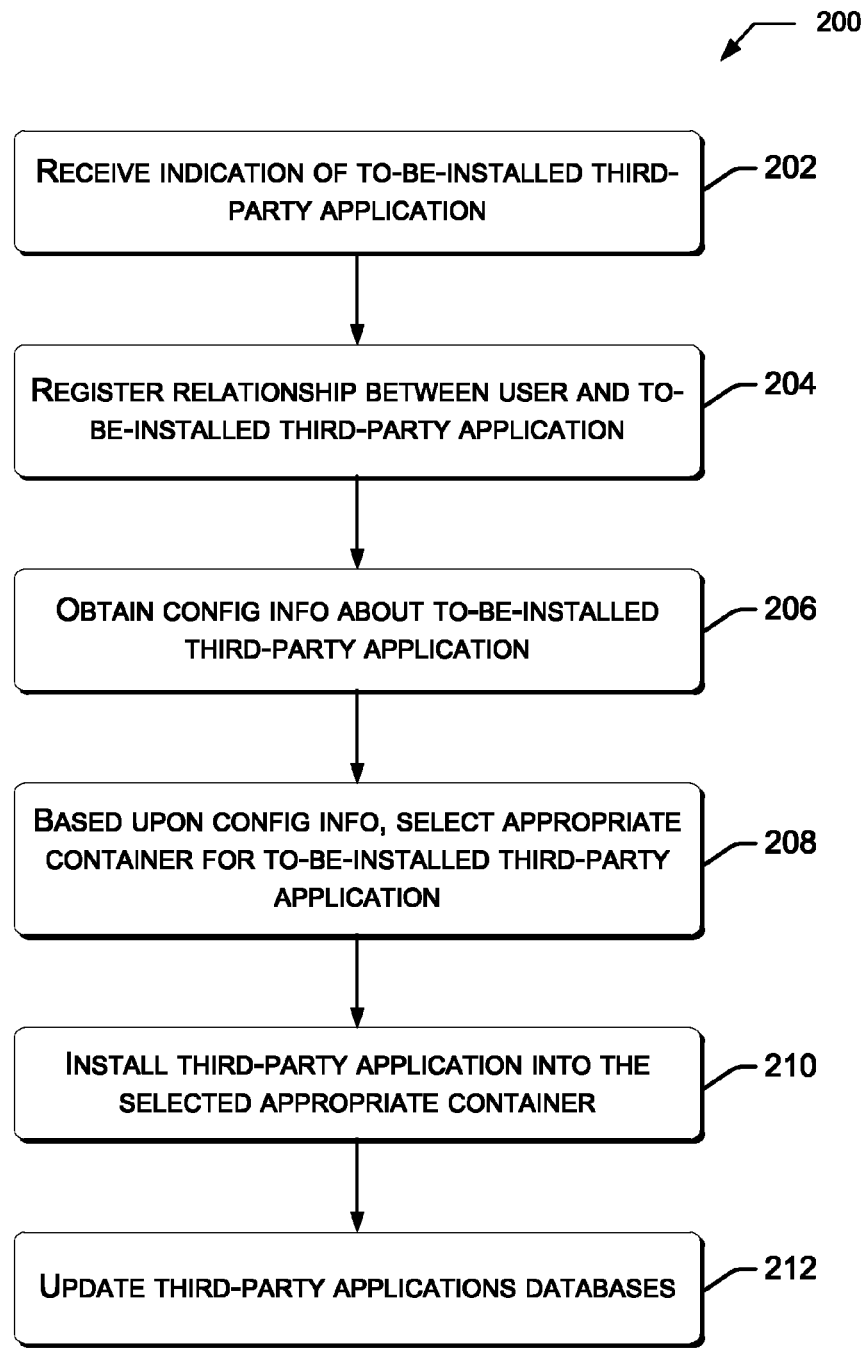
FIG. 2 is a flow chart of techniques employed in accordance with one or more implementations of the disclosure.

Referring to FIG. 2, an example process 200 that implements the techniques according to this disclosure is shown. Before the process 200 begins, a user chooses a third-party application that they are interested in installing at a network system. A web search engine, web links provided by a friend, or other techniques enable a user to discover a third-party application they are interested in employing to work with particular data, files, or other content the user has stored on the network system, e.g., the third-party application may be discovered when searching on a web-based application store or marketplace.

At 202, a network system receives an indication from the user of which third-party application that they have selected for installation. This may be accomplished, for example, by having the user click on an "install" button on a web-based application store provided by the third party via the to-be-installed third-party application.

At 204, the network system registers a relationship between a user's account and the to-be-installed third-party application. This registration initiates, at least in part, the installation of the to-be-installed third-party application on the network system. As discussed above, the installation is performed in accordance with various security protocols, and consists of establishing a relationship between the user's account and the third-party application after the user has decided to grant the third-party application access to specific resources.

At 206, the network system obtains configuration information about the to-be-installed third-party application. The configuration information is provided by the third-party application developer and may be stored in an application configuration database on the network system. The configuration information includes what types of data the application is designed to work with or operate on, and what services the application performs.

At 208, based upon the configuration information, the network system categorizes and selects the appropriate container within which to install the to-be-installed third-party application. The appropriate container is one where similar types of applications and data are installed. The one or more services performed by that type of application are characteristic of the services performed by other applications installed in that particular container. The container is selected based, at least in part, upon the types of data the to-be-installed third-party application is requesting access to, and the scope of access being requested.

At 210, the network system installs the third-party application into the selected appropriate container and notifies the container of the installation. The container is operatively configured to either take certain actions as a result of the notification, or ignore the notification. For example, if a user is currently displaying a web page from a container in one browser window while installing a third-party application in another browser window, the container may receive an installation notification from the network system. The container may then choose to redraw the user interface to reflect the newly installed application.

At 212, the network system updates one or more third-party application databases with information about the installed third-party application. For example, the network system can write to a record, such as installation database 120 shown in FIG. 1, to create an installation database recording that tracks all installation actions by various users. Additionally, the network system updates the application configuration database 110 with configuration information received from third-party application developers.

Figure 3:
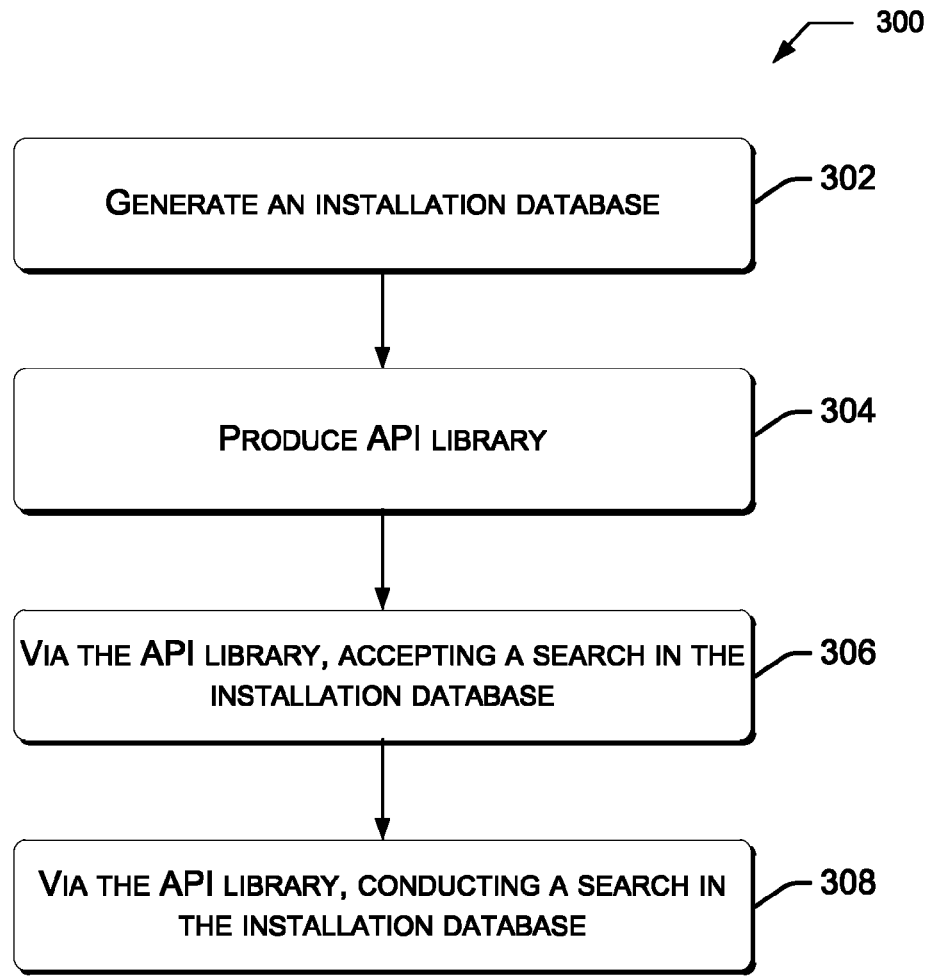
FIG. 3 is another flow chart of techniques employed in accordance with one or more implementations of the disclosure.

Referring to FIG. 3, an example process 300 that implements the techniques according to this disclosure is shown.

At 302, the network system generates an installation database that tracks all third-party application installation actions by each user of the network system.

At 304, the network system produces an Application Programming Interface (API) library. The API library is designed to enable searching of the installation database to discover the third-party applications installed for a particular user in a particular container on the network system.

At 306, via the API library, the network system receives and accepts a search request of the installation database. The search request is designed to discover the third-party applications installed for a particular user in a particular web-based application or container on the network system.

At 308, the network system searches the installation database to discover the third-party applications installed for a particular user in a particular container on the network system.

A processor may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Figure 4:
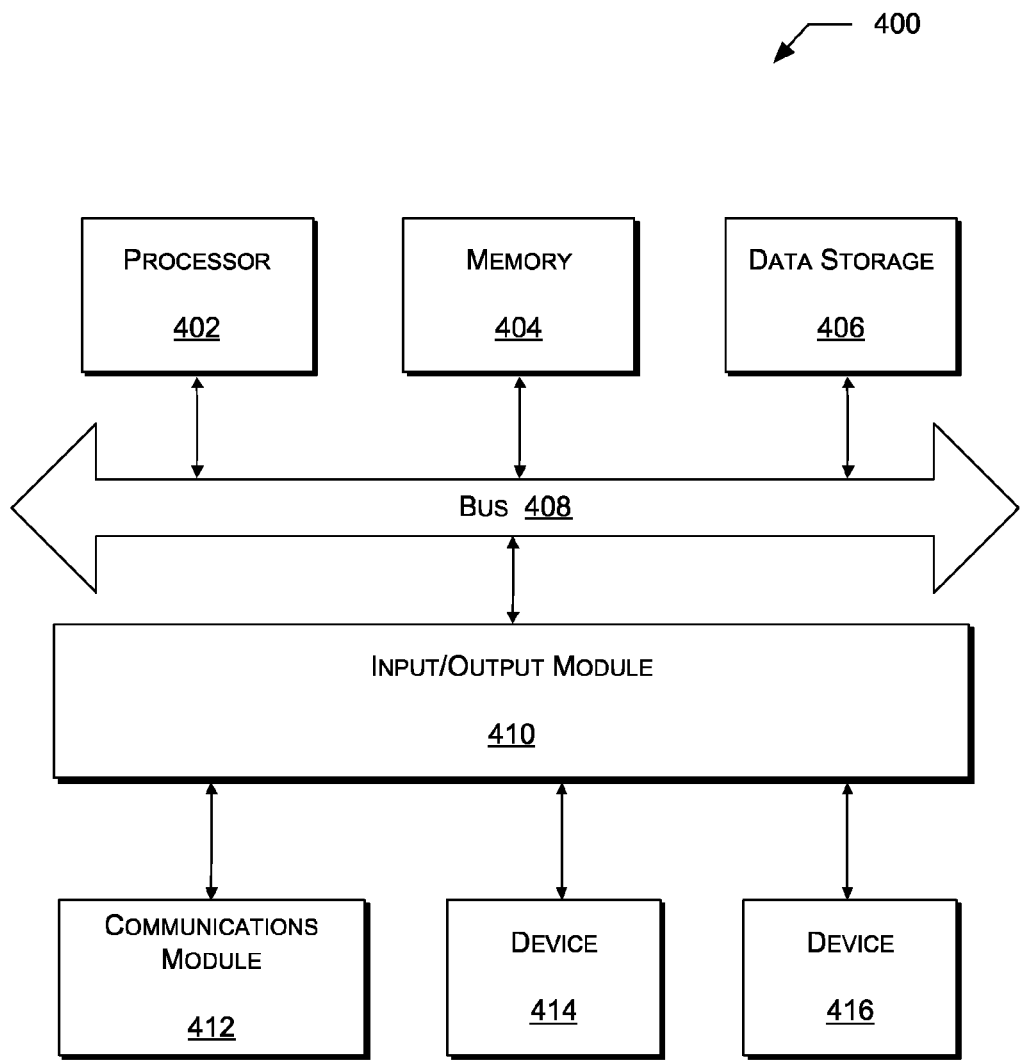
FIG. 4 is a schematic diagram of an exemplary computer system employed in accordance with one or more implementations of the disclosure.

FIG. 4 is a block diagram illustrating an exemplary computer system 400 with which the system and method of FIGS. 1, 2, and 3 can be implemented. In certain aspects, the computer system 400 may be implemented using hardware or a combination of software and hardware, either in a dedicated server, or integrated into another entity, or distributed across multiple entities.

Computer system 400 includes a bus 408 or other communication mechanism for communicating information, and a processor 402 coupled with bus 408 for processing information. By way of example, the computer system 400 may be implemented with one or more processors 402.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 include networking interface cards, such as Ethernet cards and modems. In certain aspects, the input/output module 410 is configured to connect to a plurality of devices, such as an input device 414 and/or an output device 416. Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a CRT (cathode ray tube) or LCD (liquid crystal display) monitor, for displaying information to the user.

According to one aspect of the present disclosure, the network system 100, as shown in FIG. 1, can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, an enterprise server or group of servers, one or more desktop computers, one or more laptop computers, etc. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments or implementations can also be implemented in combination in a single embodiment or implementation. Conversely, various features that are described in the context of a single embodiment or implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method that facilitates installation of a third-party application onto a network system, the method comprising:
   receiving a selection from a user of a third-party application to be installed onto the network system;
   obtaining configuration information for the third-party application;
   based upon the obtained configuration information, selecting a container on the network system for receiving the third-party application;
   installing the third-party application into the selected container;
   storing a record of the installation of the third-party application into the selected container by linking the user with the third-party applications on the network system, wherein the record comprises an application expiration time;
   sending an authorization code from a token-grant server to a third-party application along with one or more document identifications (IDs) identifying the user resources when the user installs the third-party application;
   receiving the authorization code at a token-grant server from the third-party application along with a client secret that identifies the third-party application as the intended recipient of the authorization code; and
   sending an authorization access token to the third-party application after receiving the authorization code and client secret from the third-party application.

2. The computer-implemented method according to claim 1, wherein storing the record of the installation of the third-party applications into the selected container further comprises storing:
   a user identifier; and
   an application identifier.

3. The computer-implemented method according to claim 1, wherein selecting the container comprises selecting the container based on a file type description of the third-party application.

4. The computer-implemented method according to claim 3, wherein the file type description of the third-party application comprises a Multipurpose Internet Mail Extensions (MIME) type.

5. The computer-implemented method according to claim 1, wherein selecting a container comprises:
   determining a container on the network system that contains the type of data the third-party application is capable of one or more of opening, creating, or modifying.

6. The computer-implemented method according to claim 1, wherein installing the third-party application into the container comprises:
   registering a relationship between the third-party application and a user's account.

7. The computer-implemented method according to claim 1, wherein the container is an operating environment on the network system in which homogenous or like data types are one or more of handled, managed, or used by the third-party application.

8. A non-transitory machine-readable storage medium having stored
thereon program instructions that facilitate installation of third-party applications onto a network system, the instructions when executed by a machine cause the machine to perform operations comprising:
receiving an indication of one or more to-be-installed third-party applications; obtaining configuration information about the one or more to-be-installed third-party applications;
based upon the obtained configuration information, selecting a container on the network system for receiving the one or more to-be-installed third-party applications;
installing the one or more third-party applications into the selected container; storing a record of the installation of the one or more third-party applications into the
selected container, linking the user with identifications of the one or more third-party applications installed by the user in the selected container on the network system; wherein
the record of the installation comprises an application expiration time;
sending an authorization code from a token-grant server to a third-party application along with one or more document identifications (IDs) identifying the user resources when the user installs the third-party application;
receiving the authorization code at a token-grant server from the third-party application along with a client secret that identifies the third-party application as the intended recipient of the authorization code; and
sending an authorization access token to the third-party application after receiving the authorization code and client secret from the third-party application.

9. The non-transitory storage medium according to claim 8, the operations further comprising:
creating an Application Programming Interface (API) library configured to be queried to discover the one or more third-party applications installed by the user in the selected container on the network system.

10. The non-transitory storage medium according to claim 8, the operations further comprising:
storing descriptions of the third-party applications that include an open standard authorization token that enables a user to share their user resources stored on the network system with a third-party web site or one or more third-party applications, without having to provide their full credentials to the third party for accessing the network system where the user's resources are stored.

11. The non-transitory storage medium according to claim 8, wherein:
storing a record of the installation of the one or more third-party applications into the selected container further comprises storing information linking a user with an identification of each third-party application installed by the user on the network system, wherein the identification of each third-party application comprises a tuple, or ordered list of elements, of the form:
{long user_id; // a large number that uniquely identifies the user
long app_id; // a large number that uniquely identifies the application
optional long expiration_time; // an optional expiration date for this installation, stored as milliseconds since the Unix epoch date}.

12. The non-transitory storage medium according to claim 8, wherein:
the obtained configuration information comprises an internet media type or a Multipurpose Internet Mail Extensions (MIME) type.

13. An application installation system configured to facilitate installation of third-party applications onto a network system, the application installation system comprising:
an application description database configured to store descriptions of third-party applications, wherein the descriptions of the third-party applications enable the third-party applications to access user resources stored on the network system;
a uniform resource locator (URL)-accessible installation utility configured to provide a URL destination address from which a user can initiate an installation action to install a third-party application on the network system;
a record indicating a container on the network system into which a third-party application is installed;
an application installation database configured to store a record of user installation actions including information linking a user with an identification of each third-party application installed by the user on the network system;
a processor configured to:
receive a user selection of a third-party application to be installed onto the network system,
obtain configuration information for the user-selected third-party application,
select, based upon the obtained configuration information, a container on the network system for receiving the user-selected third-party application,
install the user-selected third-party application into the selected container,
store a record of the installation of the third-party application in the application installation database, wherein the record comprises an application expiration time; and
identify one or more third-party applications associated with a user in response to an Application Programming Interface (API) library command;
send an authorization code and a document identification (ID) to a third-party application in response to a user installation of the third-party application for use with a resource identified by the document ID;
receive, from the third-party application, the authorization code and a client secret that
identifies the third-party application as the intended recipient of the authorization code; and
send an authorization access token to the third-party application in response to receiving the authorization code and the client secret from the third-party application.

14. The system according to claim 13, further including:
an API that conforms to Representational State Transfer (REST) architecture.

15. The system according to claim 13, wherein:
the descriptions of the third-party applications stored in the application description database include an internet media type or a Multipurpose Internet Mail Extensions (MIME) type.

16. The system according to claim 13, wherein:
the user resources comprise one or more of files, photographs, videos, documents, contact lists, data, or other content that a user has created or otherwise obtained, and that the user has one or more of ownership of, access to, or control over.

17. The system according to claim 13, further including:
the application description database further configured to store descriptions of the third-party applications that include an open standard authorization token that enables a user to share their user resources stored on the network system with a third-party web site or one or more third-party applications, without having to provide full credentials for accessing the network system to the third party.

18. The system according to claim 17, wherein:
the user's resources comprise one or more of files, photographs, videos, documents, contact lists, data, or other content that a user has created or otherwise obtained, and that the user has one or more of ownership of, access to, or control over.

19. The system according to claim 13, wherein:
the record indicating an appropriate web-based application on the network system designates a Multipurpose Internet Mail Extensions (MIME) type of data to be stored in the web-based application and manipulated by the third-party application installed into the web-based application.

20. The system according to claim 13, further including:
the application installation database further configured to store a record of user installation actions including information linking a user with an identification of each application installed by the user on the network system, wherein the identification of each application comprises a tuple, or ordered list of elements, of the form:
{long user_id; // a large number that uniquely identifies the user
long app_id; // a large number that uniquely identifies the application
optional long expiration_time; // an optional expiration date for this installation, stored as milliseconds since the Unix epoch date}.

\* \* \* \* \*